(12) United States Patent
Fujita

(10) Patent No.: US 7,016,074 B1
(45) Date of Patent: Mar. 21, 2006

(54) COLOR PROOF FORMING METHOD AND COLOR PROOF FORMING APPARATUS

(75) Inventor: Katsushi Fujita, Sayama (JP)

(73) Assignee: Konica Corporation, Tokyo (JP)

( * ) Notice: Subject to any disclaimer, the term of this patent is extended or adjusted under 35 U.S.C. 154(b) by 935 days.

(21) Appl. No.: 09/590,173

(22) Filed: Jun. 9, 2000

(30) Foreign Application Priority Data

Jun. 11, 1999 (JP) .................................. 11-165489

(51) Int. Cl.
G06F 15/00 (2006.01)
H04N 1/46 (2006.01)

(52) U.S. Cl. ...................................... 358/1.9; 358/509

(58) Field of Classification Search ................ 347/115, 347/118, 232, 238, 240, 251; 430/293, 138, 430/505, 358; 355/32, 37; 358/529, 509, 358/514, 530, 1.9; 382/167, 162
See application file for complete search history.

(56) References Cited

U.S. PATENT DOCUMENTS

| | | | | |
|---|---|---|---|---|
| 4,628,216 A | * | 12/1986 | Mazumder .................. 326/126 |
| 4,705,745 A | * | 11/1987 | Kitchin et al. .............. 430/505 |
| 4,814,827 A | * | 3/1989 | Kitchin et al. ............... 355/37 |
| 4,889,794 A | * | 12/1989 | Terahata ..................... 430/293 |
| 4,908,712 A | * | 3/1990 | Uchiyama et al. ........... 358/1.9 |
| 4,916,530 A | * | 4/1990 | Neilson et al. ............. 347/238 |
| 4,953,015 A | * | 8/1990 | Hayasaki et al. ........... 358/529 |
| 5,012,259 A | * | 4/1991 | Hattori et al. .............. 347/232 |
| 5,053,808 A | * | 10/1991 | Takagi ......................... 355/38 |
| 5,096,801 A | * | 3/1992 | Koya et al. ................. 430/293 |
| 5,162,820 A | | 11/1992 | Yamamoto et al. |
| 5,280,348 A | | 1/1994 | Honma et al. |
| 5,331,440 A | * | 7/1994 | Kita et al. .................. 358/529 |
| 5,408,296 A | * | 4/1995 | Okutsu et al. ................ 355/32 |
| 5,428,377 A | * | 6/1995 | Stoffel et al. ................. 347/15 |
| 5,436,117 A | * | 7/1995 | Hoshino et al. ............ 430/358 |
| 5,449,592 A | * | 9/1995 | Yoshizawa et al. ......... 430/358 |
| 5,473,358 A | * | 12/1995 | Guerin ....................... 347/240 |
| 5,571,663 A | * | 11/1996 | Hirai .......................... 430/504 |
| 5,596,355 A | * | 1/1997 | Koyama et al. .............. 347/43 |
| 5,739,841 A | * | 4/1998 | Ng et al. .................... 347/240 |
| 5,744,287 A | * | 4/1998 | Roberts et al. ............. 430/363 |
| 5,767,887 A | * | 6/1998 | Warner et al. .............. 347/115 |
| 5,923,447 A | * | 7/1999 | Yamada ...................... 358/523 |
| 5,983,045 A | | 11/1999 | Suzuki et al. |
| 6,002,498 A | * | 12/1999 | Haraguchi et al. .......... 358/518 |

(Continued)

FOREIGN PATENT DOCUMENTS

EP 0 807 864 A1 11/1997

(Continued)

OTHER PUBLICATIONS

European Search Report.

Primary Examiner—Madeleine Nguyen
(74) Attorney, Agent, or Firm—Finnegan, Henderson, Farabow, Garrett & Dunner, L.L.P.

(57) ABSTRACT

A color proof forming apparatus having: a structure in which a plurality of light sources with different wavelengths are provided, and a light sensitive material is exposed to the light beams emitted from the plurality of light sources; an image processor to receive image data of a plurality of colors including the color black, and to form the data for the exposure; a controller to control the plurality of light sources according to the data for the exposure formed by the image processor, wherein the image processor forms different exposure data for image data in which black and other colors overlap, than for image data of only black.

6 Claims, 16 Drawing Sheets

U.S. PATENT DOCUMENTS

| | | | |
|---|---|---|---|
| 6,034,710 A * | 3/2000 | Kawabe et al. | 347/236 |
| 6,218,068 B1 * | 4/2001 | Tanaka et al. | 430/138 |
| 6,239,829 B1 * | 5/2001 | Curry | 347/251 |
| 6,437,816 B1 * | 8/2002 | Fujita et al. | 347/233 |
| 6,496,280 B1 * | 12/2002 | Ishikawa et al. | 358/1.9 |
| 6,700,679 B1 * | 3/2004 | Fujita et al. | 358/1.9 |
| 2002/0076661 A1 * | 6/2002 | Kawamura et al. | |
| 2002/0097437 A1 * | 7/2002 | Fujita et al. | |

FOREIGN PATENT DOCUMENTS

| | | |
|---|---|---|
| EP | 0 898 415 A2 | 2/1999 |
| JP | 01075252 A * | 3/1989 |
| JP | 10-148990 | 6/1998 |

\* cited by examiner

FIG. 1

| PRINTED MATTER | | | | RED LIGHT EMISSION INTENSITY | GREEN LIGHT EMISSION INTENSITY | BLUE LIGHT EMISSION INTENSITY | REPRODUCED COLOR THROUGH EXPOSURE | |
|---|---|---|---|---|---|---|---|---|
| BK | C | M | Y | | | | | |
| 0 | 0 | 0 | 1 | 100 | 100 | 10 | Y | |
| 0 | 0 | 1 | 0 | 100 | 10 | 100 | M | |
| 0 | 1 | 0 | 0 | 10 | 100 | 100 | C | |
| 0 | 1 | 1 | 0 | 10 | 10 | 100 | B | |
| 0 | 1 | 0 | 1 | 10 | 100 | 10 | G | |
| 0 | 0 | 1 | 1 | 100 | 10 | 10 | R | |
| 0 | 1 | 1 | 1 | 10 | 10 | 10 | GY | |
| 0 | 0 | 0 | 0 | 100 | 100 | 100 | W | |
| 1 | 0 | 0 | 0 | 5 | 5 | 5 | BK | |
| 1 | 0 | 0 | 1 | 5 | 5 | 0 | BK+ | Y |
| 1 | 0 | 1 | 0 | 5 | 0 | 5 | | M |
| 1 | 0 | 1 | 1 | 5 | 0 | 0 | | R |
| 1 | 1 | 0 | 0 | 0 | 5 | 5 | | C |
| 1 | 1 | 0 | 1 | 0 | 5 | 0 | | G |
| 1 | 1 | 1 | 0 | 0 | 0 | 5 | | B |
| 1 | 1 | 1 | 1 | 0 | 0 | 0 | | GY |

| PRINTED MATTER | | | | RED LIGHT EMISSION INTENSITY | GREEN LIGHT EMISSION INTENSITY | BLUE LIGHT EMISSION INTENSITY | REPRODUCED COLOR THROUGH EXPOSURE |
|---|---|---|---|---|---|---|---|
| BK | C | M | Y | | | | |
| 0 | 0 | 0 | 1 | 100 | 100 | 0 | Y |
| 0 | 0 | 1 | 0 | 100 | 0 | 100 | M |
| 0 | 1 | 0 | 0 | 0 | 100 | 100 | C |
| 0 | 1 | 1 | 0 | 0 | 0 | 100 | B |
| 0 | 1 | 0 | 1 | 0 | 100 | 0 | G |
| 0 | 0 | 1 | 1 | 100 | 0 | 0 | R |
| 0 | 1 | 1 | 1 | 0 | 0 | 0 | GY |
| 0 | 0 | 0 | 0 | 100 | 100 | 100 | W |
| 1 | 0 | 0 | 0 | 0 | 0 | 0 | BK ① |
| 1 | 0 | 0 | 1 | 0 | 0 | 0 | |
| 1 | 0 | 1 | 0 | 0 | 0 | 0 | |
| 1 | 0 | 1 | 1 | 0 | 0 | 0 | |
| 1 | 1 | 0 | 0 | 0 | 0 | 0 | |
| 1 | 1 | 0 | 1 | 0 | 0 | 0 | |
| 1 | 1 | 1 | 0 | 0 | 0 | 0 | |
| 1 | 1 | 1 | 1 | 0 | 0 | 0 | |

| PRINTED MATTER | | | | RED LIGHT EMISSION INTENSITY | GREEN LIGHT EMISSION INTENSITY | BLUE LIGHT EMISSION INTENSITY | REPRODUCED COLOR THROUGH EXPOSURE | |
|---|---|---|---|---|---|---|---|---|
| BK | C | M | Y | | | | | |
| 0 | 0 | 0 | 1 | 0 | 0 | 90 | Y | |
| 0 | 0 | 1 | 0 | 0 | 90 | 0 | M | |
| 0 | 1 | 0 | 0 | 90 | 0 | 0 | C | |
| 0 | 1 | 1 | 0 | 90 | 90 | 0 | B | |
| 0 | 1 | 0 | 1 | 90 | 0 | 90 | G | |
| 0 | 0 | 1 | 1 | 0 | 90 | 90 | R | |
| 0 | 1 | 1 | 1 | 90 | 90 | 90 | GY | |
| 0 | 0 | 0 | 0 | 0 | 0 | 0 | W | |
| 1 | 0 | 0 | 0 | 95 | 95 | 95 | BK | |
| 1 | 0 | 0 | 1 | 95 | 95 | 100 | BK+ | Y |
| 1 | 0 | 1 | 0 | 95 | 100 | 95 | | M |
| 1 | 0 | 1 | 1 | 95 | 100 | 100 | | R |
| 1 | 1 | 0 | 0 | 100 | 95 | 95 | | C |
| 1 | 1 | 0 | 1 | 100 | 95 | 100 | | G |
| 1 | 1 | 1 | 0 | 100 | 100 | 95 | | B |
| 1 | 1 | 1 | 1 | 100 | 100 | 100 | | GY |

COLOR PROOF FORMING METHOD AND COLOR PROOF FORMING APPARATUS

BACKGROUND OF THE INVENTION

The present invention relates to a color proof forming method and a color proof forming apparatus, and specifically to a method for forming the color poof by exposing the silver halide, color light-sensitive material with a plurality of light sources having different wavelengths according to the dot image data processed by an RIP (Raster Image Processor), and to the color proof forming apparatus.

There is a case where, when a color printed matter is formed, the color correction is carried out on the stage of the document film, and a correction print (color proof) is formed by using the color separation dot document film which is color-separated to a Y (yellow) image, M (magenta) image, C (cyan) image, and BK (black) image. Before an actual film print is formed, the color proof is checked to see whether the layout of the document film, the color, the characters, and the like are correct, thereby confirming the finish of the printed matter before printing.

Recently, the DDCP (Direct Digital Color Proof) method is used to form the color proof. As one method of the DDCP, a light spot composed of the combination of a plurality of light rays with different wavelengths, such as, for example, R, G and B, is exposed on the silver halide, light-sensitive material. The combination of light in the light spot is according to the dot image data of the color separation dot document, and results in colored dots of Y, M, C, and BK.

However, recently, by the spread of DTP (Desk Top Publishing), or the like, an operation in which an image inputted by a scanner is image-edited and paginated by the software of a computer and editing by the full digital system is commonly used.

Three options may be used to make such a process more efficient: an image setter output to directly output the page-edited image data onto the film, a CTP (Computer to Plate) output to directly conduct the image recording on the print film, or a CTC (Computer to Cylinder) to directly image-record onto the print film wound around a cylinder of the printing machine.

In each of the above three cases, the film or the print film is wasted, or superfluous operations increase when a film output or print film output is generated once for only the correction confirmation, and when the print correction, or the correction by the other correction material is conducted.

Accordingly, specifically, in the process in which such fully digitized image formation and editing are conducted by the computer, a system is required by which the color image output is directly conducted, which is called the DDCP (Direct Digital Color Proof) or the DCP (Digital Color Proof).

This DDCP forms a color proof to reproduce the output object shown by the digital image processed by the computer, and confirms its pattern, image tone, and the sentence and characters. It does this before recording onto the print making film from the digital image data processed by the computer by the image setter, or the like, or conducting the final printing operation for directly forming the print film by the CTP, or directly recording the image onto the print film wound around the cylinder of the printing machine by the CTC.

Further, in a process of proofreading in such a printing process, the proof is mainly formed and used as: (1) a proof for confirming an error inside of the operation site, (2) a proof to be submitted to an ordering person, or a designer for confirming the finish, and (3) a print sample to be submitted to the operator of the printing machine as the sample of the final printed matter.

In the above-mentioned proof (1) and a part of the proof (2), there is a case that, for reducing the delivery time and the cost, the proofreading material is that by which the dot image cannot be reproduced. That is, the proofreading is conducted by a sublimation transfer system or for an output means such as inkjet or electrophotography, the proofreading material is mainly used as the proof for the page-effect confirmation. However, for the confirmation of the reproducibility of a highlight portion or the confirmation of fine details, or the confirmation of the unsuitable interference fringes of the dot image, called moire, at the time of printing, the actual situation is that a proof by which the printing dot is faithfully reproduced, is strongly required.

For such needs, recently, a DDCP is becoming popular in which, by using a high power heat mode laser, the image exposure is conducted on the sublimation transfer recording material or the heat sensitive recording material, and these are transferred onto the printing paper. However, in these systems, the cost of the laser head and of the machine is high, as well as the cost of the material, because many color image forming sheets are used. Further, the process from image exposure to transferring, which is necessary for the number of colors, requires too long of a period of time.

Accordingly, as an apparatus to form such a color proof, an image recording apparatus, which has a drum provided with a plurality of holes penetrating from the outer peripheral surface to the inside, and a rotation driving mechanism to rotate the drum, and which exposes corresponding to the digital image signal, and records the dot image while rotating the drum by the rotation driving mechanism, under the condition that the light-sensitive material is being held on the drum, is proposed.

Incidentally, recently, with the DTP advances the image pattern can be freely superimposed with image process software on a personal computer. Accordingly, the user increasingly superimposes a black image on a color image without knowledge of having done so.

In this case, on the display of the personal computer, the entire region in which the black image is superimposed on other color images, looks black. Accordingly, the user is not aware of the situation that other color images, which are actually unnecessary, are under the black image.

Further, also in the DDCP, an image in which the black image and other color images are superimposed on each other, is expressed by only the color black, and the entire superimposed region looks black. One does not perceive that the black image and the other color images are superimposed.

However, when the printing is actually conducted, because the portion of the image that is only black, and the portion in which the black image and the other color images are superimposed on each other (hereinafter, in this specification, called a "black overlap portion") do appear different, it is only then perceived that the unnecessary other color images and the black image overlap. That is, the error in the image processing stage is first perceived at the time of the printing, and a large amount of operating time and/or each kind of material is wasted.

SUMMARY OF THE INVENTION

The present invention is attained to solve the above problems, and an object of the present invention is to realize a color proof forming apparatus and method to form a color proof with which to discriminate a black overlap portion from a black only portion.

Structures (1) to (5) to attain the above object are as follows.

(1) A color proof forming apparatus, having a structure in which a plurality of light sources with different wavelengths are provided, and light-sensitive material is exposed to the light beams emitted from the plurality of light sources the apparatus also has an image processor, which receives image data of a plurality of colors including black and forms data for the exposure and a controller. The controller controls the plurality of light sources according to the exposure data formed by the image processor, and the image processor forms different exposure data for image data in which black and other colors overlap than for black-only image data.

(2) A color proof forming apparatus according to Structure (1), wherein the different exposure data results in a higher density black color being generated in a color light-sensitive material for the image data in which black and other colors overlap than that generated for the black-only image data.

(3) A color proof forming apparatus according to Structure (1), wherein the different exposure data results in a lower density black color being generated in a color light-sensitive material for the image data in which black and other colors overlap than that generated for the black-only image data.

(4) A color proof forming method, comprising the steps of: receiving image data for a plurality of colors including black; forming different exposure data for image data in which black and another color overlap than for black-only image data; exposing a color light-sensitive material according to the exposure data; and forming a color proof.

(5) A color proof forming method, having steps to expose color light-sensitive material according to the image data for the plurality of colors including black, and to form the color proof wherein the exposure conditions for the color light-sensitive material differ between the exposure condition for the image data in which black and another color overlap, and the exposure condition for the image data of black only.

Further, preferred structures (6) to (9) are as follows.

(6) A color proof forming structure to form a color proof by exposing color light-sensitive material according to image data of a plurality of colors including black, which is characterized in that the color light-sensitive material is exposed under different exposure conditions. The exposure condition for image data in which black and other colors overlap is different from that for image data of only black.

(7) The following color proof forming apparatus may be used to form a color proof by exposing color light-sensitive material to a plurality of light sources having the different wavelengths, the exposure being conducted according to image data. The color proof forming apparatus has an image processor, which receives image data of a plurality of colors, and generates exposure data. It also has an exposure device to receive the exposure data from the image processor and to expose the color light-sensitive material. The image processor forms different exposure data for image data in which black and other colors overlap than for image data of only black.

(8) A color proof forming apparatus according to Structure (7), wherein, for image data in which black and other colors overlap, the image processor forms the exposure data to generate a higher density black color on the color light-sensitive material than the black color generated for image data of black only.

(9) A color proof forming apparatus according to Structure (7), wherein, for image data in which black and other colors overlap, the image processor forms the exposure data to generate a lower density black color on the color light-sensitive material than the black color generated for image data of black only.

BRIEF DESCRIPTION OF THE DRAWINGS

FIG. 1 is a view showing an example of an LUT in an embodiment consistent with the present invention.

DETAILED DESCRIPTION OF THE PREFERRED EMBODIMENT

Figure 2:
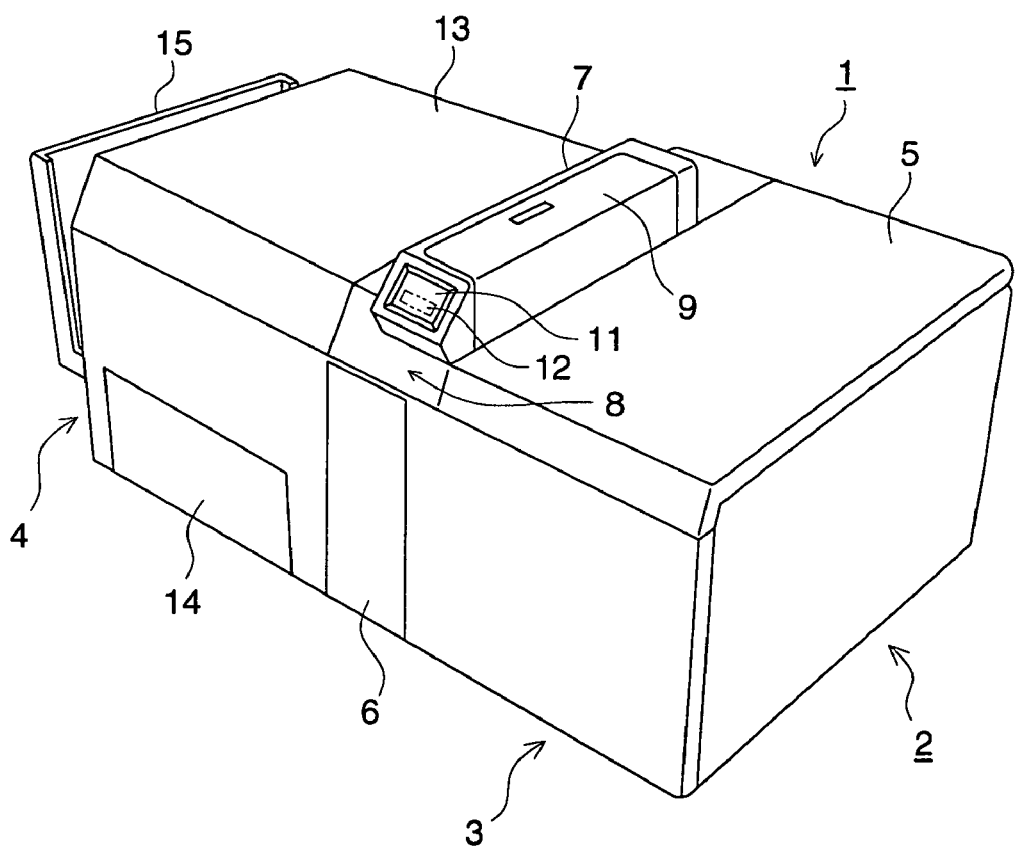
FIG. 2 is a perspective view of an embodiment consistent with the present invention.

Referring to the drawings, an embodiment consistent with the present invention will be described below. Further, there is a description in which the meaning of terms are described, however, this is the description which describes the meaning of terms strictly in the embodiment, and the meaning of terms of the present invention is not limited to this description.

(Structure)

Initially, the overall structure of an image recording apparatus to which the embodiment of the present invention is applied, will be described.

The image recording apparatus of the present embodiment is an apparatus to obtain a color proof to confirm the absence or presence of errors prior to forming the printed film from a digital image signal. Specifically, this is an apparatus by which, a color proof is formed from the digital image signal, to simulate an image that would be on the printed film. The existence of an error, in, for example, the layout, color, characters, etc., of the image shown by the digital image signal, may be determined, from the color proof prior to finishing the printed matter.

In the image recording apparatus of the present embodiment, the light-sensitive material, which is a roll of silver-halide, color, photographic, light-sensitive material, is set. Then in the exposure section, after it is cut into the sheet-like material, it is exposed corresponding to the digital image signal. Then it is developed in a development processing section, and the color proof is formed.

Figure 3:
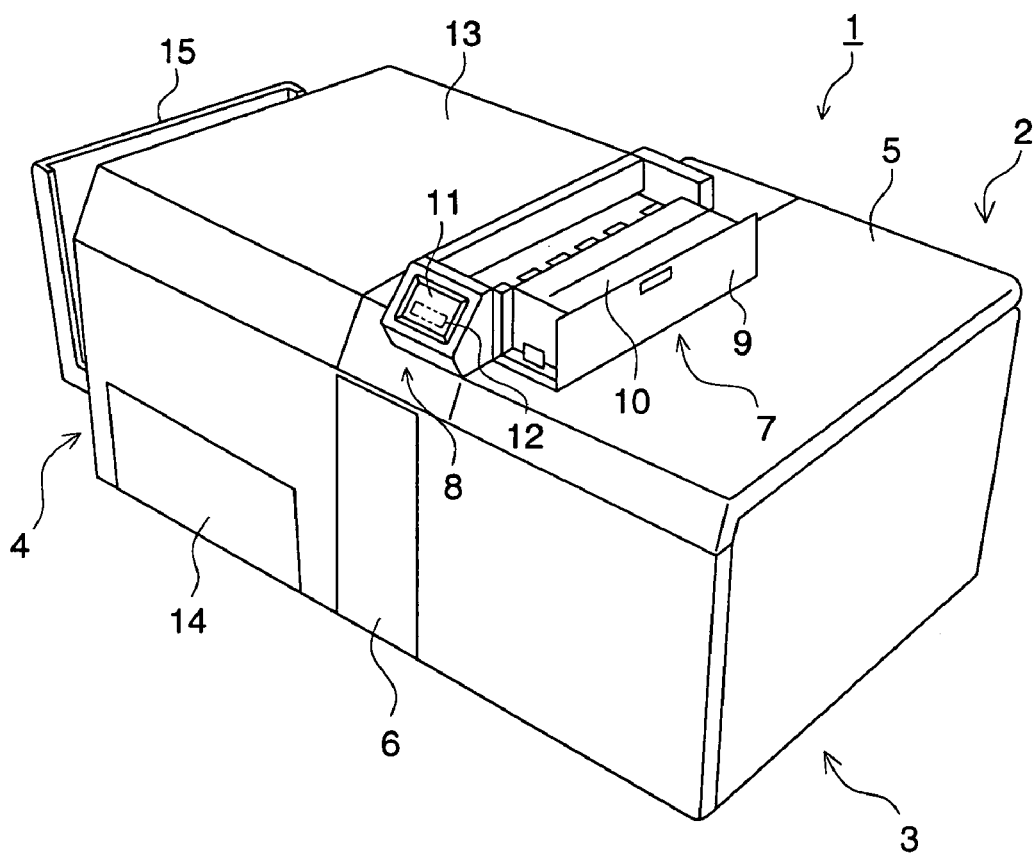
FIG. 3 is a perspective view of the embodiment of FIG. 2.
Figure 4:
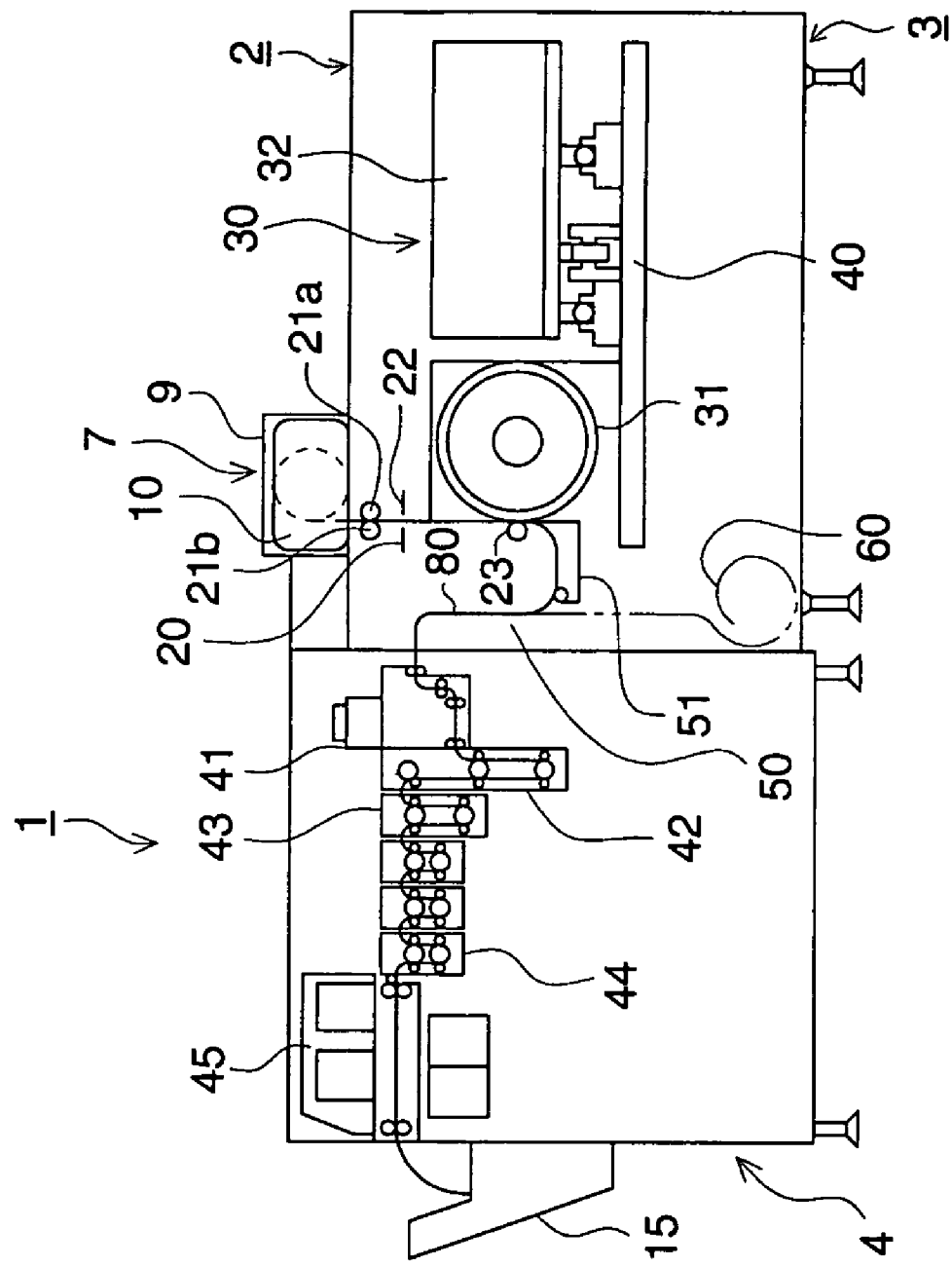
FIG. 4 is a typical view showing the internal structure of the embodiment of FIG. 2.

In FIG. 2 to FIG. 4, the color proof forming apparatus is shown. FIG. 2 is a perspective view of the color proof forming apparatus, FIG. 3 is a perspective view of the color proof forming apparatus in the condition in which a feed cover is opened, and FIG. 4 is a typical view of the internal structure of the color proof forming apparatus.

In an apparatus main body 2 of the color proof forming apparatus 1, an exposure unit 3 and a development processing unit 4 are provided. In the exposure unit 3, an upper surface panel 5, and a front surface panel 6 are provided so that these can be opened and closed, and the maintenance operation can be conducted from the upper surface and front surface side. On the upper portion of the exposure unit 3, a sheet loading section 7 is located on the development section side, and an operation section 8 is located on the front surface side of the apparatus main body 2 on the front side of the sheet loading section 7. In the sheet loading section 7, a feed cover 9 is provided so that it can be opened and closed, and a cartridge 10, which accommodates the light-sensitive material (hereinafter, called paper or light-sensitive material), can be set by the feed cover 9. A liquid crystal panel 11 and a touch panel 12 are provided in the operation section 8.

An upper surface panel 13 and a replenishment panel 14 are provided to the development processing unit 4 so that these panels can be opened and closed, and the maintenance operation is carried out from the upper surface side, and a processing solution may be replenished from the front surface side. A sheet delivery section 15 is provided on the side portion of the development processing unit 4, and the processed light-sensitive material is delivered to the sheet delivery section 15.

FIG. 4 is a view showing a schematic structure of the color proof forming apparatus. In the exposure unit 3, a sheet feed section 20, a primary scanning section 30, a sub-scanning section 40, a sheet delivery section 50, and an accumulator section 60 are provided. In the sheet feed section 20, feed rollers 21a, 21b, a cutter 22, and a drum feed roller 23 are provided. The light-sensitive material is pulled from the cartridge 10 by the feed rollers 21a and 21b, cut into a predetermined length by the cutter 22, and fed to the primary scanning section 30 through the drum feed roller 23.

A drum 31 is rotatably provided in the primary scanning section 30, and the light-sensitive material is attracted to the outer surface of the drum 31, and integrally rotated. An optical unit 32 is arranged opposite to the drum 31, and the optical unit 32 can move in parallel with the drum axis by the sub-scanning section 40. The optical unit 32 receives the digital image signal and exposes the light-sensitive material attracted onto drum 31 by an LED light emitting beam, and writes the image onto the light-sensitive material.

The sheet delivery section 50 is provided with a separation guide 51, and the light-sensitive material onto which writing is completed, is separated from the drum 31 by the separation guide 51 and sent to the development processing unit 4. At this time, when the conveyance speed of the development processing unit 4 is slower than the sheet delivery speed of the exposure unit 3, the light-sensitive material is sent to the accumulator section 60 while the sheet delivery speed is high, and the light-sensitive material is accumulated so that it hangs down on the accumulator section 60, and is in timed relationship with the conveyance timing of the development processing unit 4, so that the processing capacity of the exposure unit 3 is not lowered.

The development processing unit 4 is provided with the second exposure section 41 (hereinafter, an example of the reversal exposure direct positive light-sensitive material will be described), the development section 42, fixing section 43, stabilization section 44, and drying section 45. A portion of the light-sensitive material which is not exposed by the exposure unit 3 forms a false-image by the second exposure section 41, and the light-sensitive material which is second-exposed, is conveyed to the development section 42, fixing section 43 and stabilization section 44, and development processed, and the processed light-sensitive material is dried by the drying section 45, and sent to the sheet delivery section 15.

Figure 5:
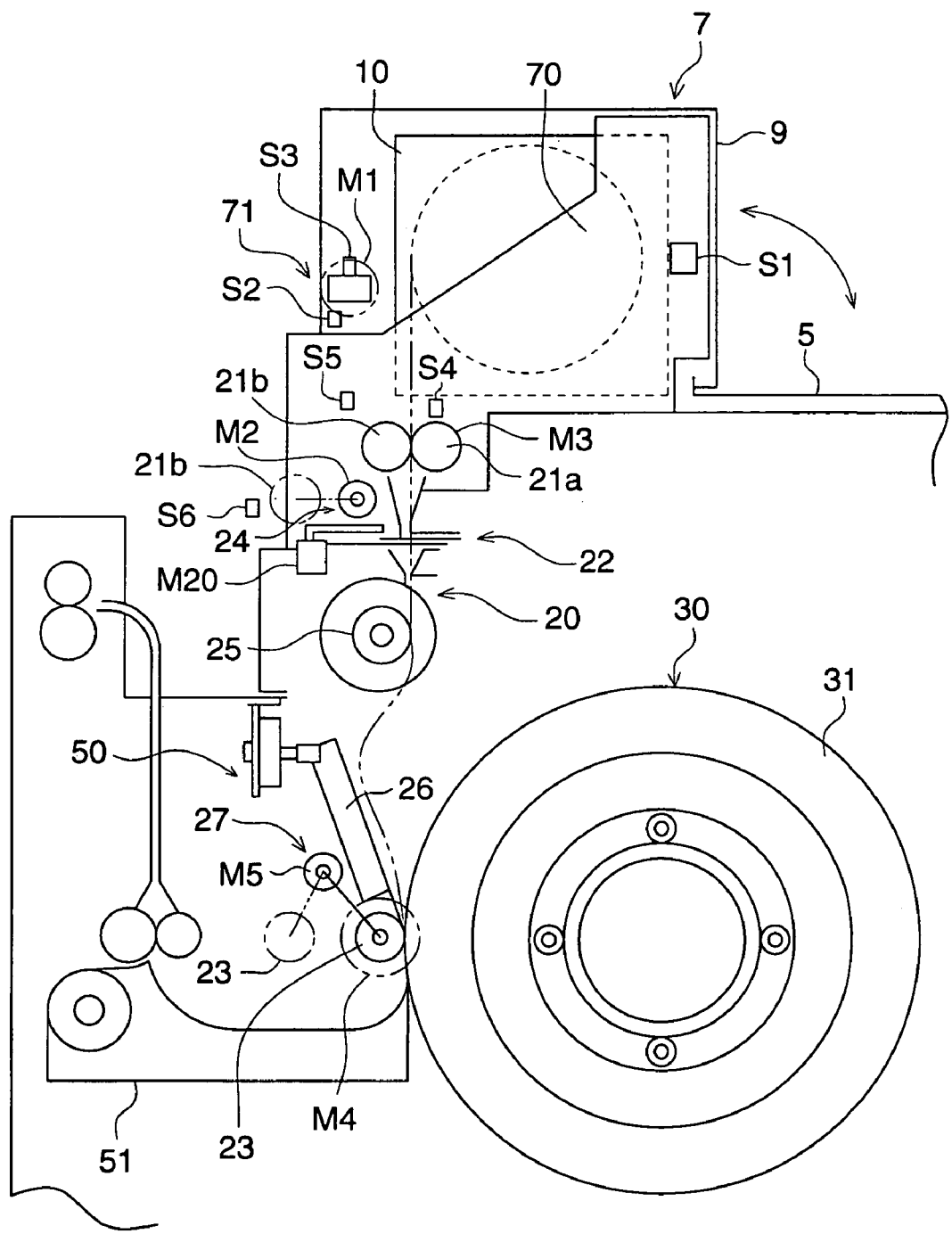
FIG. 5 is a typical view showing a portion of the internal structure of the embodiment of FIG. 2.
Figure 6:
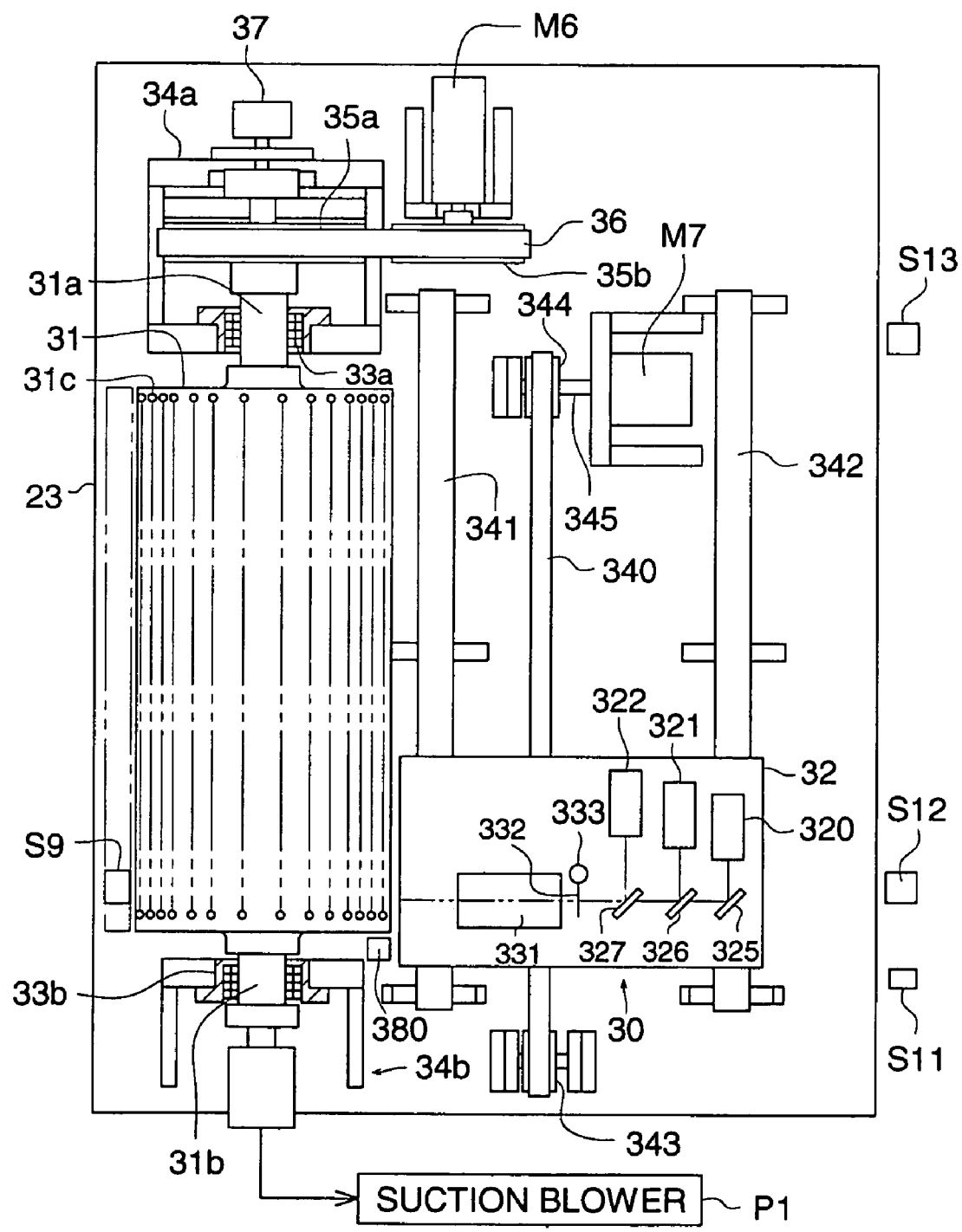
FIG. 6 is a typical view showing a portion of the internal structure of the embodiment of FIG. 2.
Figure 7:
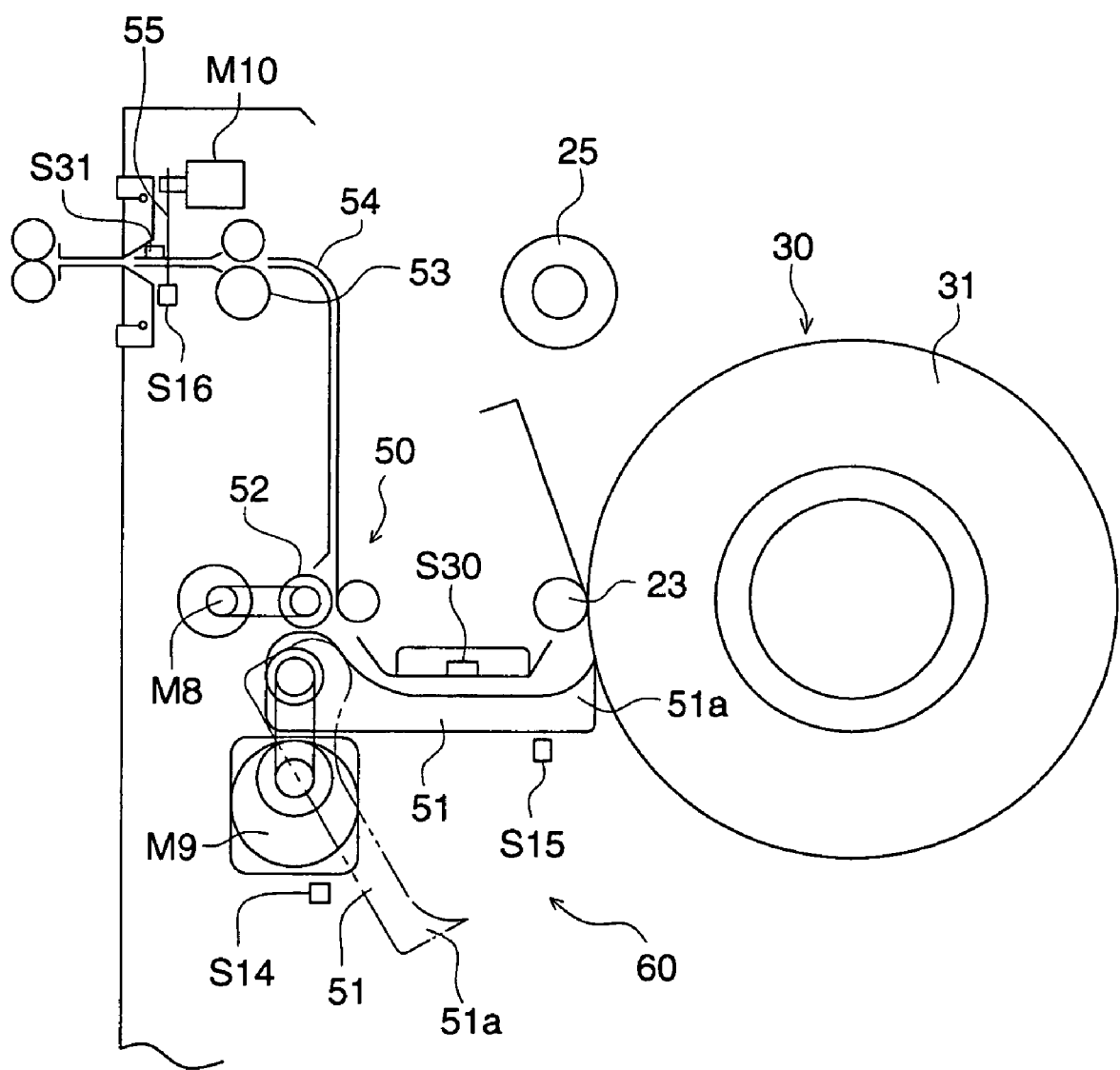
FIG. 7 is a typical view showing a portion of the internal structure of the embodiment of FIG. 2.

Next, the structure of each section of the color proof forming apparatus will be detailed by using FIG. 5 to FIG. 7. FIG. 5 is a side view showing a paper loading section and a paper feed section, FIG. 6 is a plan view showing the primary scanning section and the sub-scanning section, and FIG. 7 is a side view showing a sheet delivery section and an accumulator section.

The paper loading section 7 is provided with the feed cover 9 on the upper surface panel 5 so that it can be opened and closed, and under the condition that the feed cover 9 is opened, a cartridge 10 is set to a loading port 70. Under the condition that the cartridge 10 is set, the feed cover 9 is closed, and the feed cover 9 is locked by a lock mechanism 71. The lock mechanism 71 is operated by a cover lock motor M1. The feed cover 9 is provided with a cartridge presence sensor S1, and a closing cover sensor S2 and a cover lock detecting sensor S3 are provided in the loading port 70. The cartridge 10 is set at the position of the feed rollers 21a and 21b of the feed section 20 under the condition that a leading edge portion of the light-sensitive material is pulled out by a predetermined length.

A paper end sensor S4 is provided in the feed section 20 between the feed rollers 21a, 21b and the cartridge 10, and the trailing edge of the light-sensitive material pulled from the cartridge 10 is detected by the paper end sensor S4. A position of one feed roller 21a is fixed, and the other feed roller 21b can be moved by a roller movement mechanism 24. The feed roller 21b is moved to a stand-by position for preventing the paper from wrinkling due to the pressure-contact of the roller, except for the time period during the paper conveyance operation. The roller movement mechanism 24 is operated by a feed roller pressure release motor M2.

During the conveyance of the light-sensitive material, the feed roller 21b is moved to the conveyance position, and the light-sensitive material is pressure-contacted between the feed rollers 21a and 21b which are opposite each other. The position of the feed roller 21b is detected by a feed roller pressure-contact position detecting sensor S5 and a feed roller release position detecting sensor S6. The feed roller 21a is operated by the feed motor M3.

The cutter 22 is operated by a cutter motor M20. An encoder roller 25 and a guide 26 are provided between the cutter 22 and a drum feed roller 23. The encoder roller 25 sends the light-sensitive material by the rotation, and detects the feed amount of the light-sensitive material.

The drum feed roller 23 can be moved to the contact pressure position and the release position by the roller movement mechanism 27. This drum feed roller 23 is driven by the drum feed motor M4. The position of the drum feed roller 23 is detected by the drum feed roller pressure position detecting sensor S7 and the drum feed roller release position detecting sensor S8, which are not shown in the drawing. The roller movement mechanism 27 is operated by the drum feed roller pressure release motor M5.

Shaft portions 31a and 31b of both ends of the drum 31 of the primary scanning section 30 are pivotally supported rotatably by support bases 34a and 34b through bearings 33a and 33b. A drive pulley 35a is provided on one shaft portion 31a of the drum 31, and the drive pulley 35a is connected to an output pulley 35b of a drum rotation motor M6 with a belt 36, and the drum 31 is rotated by the drive of the drum rotation motor M6. Further, on one shaft portion 31a of the drum 31, a rotary encoder 37 is provided, and the rotary encoder 37 outputs a rotation pulse, and is used for the pixel clock control which is in timed relationship with the drum rotation.

The other shaft portion 31b of the drum 31 is connected to a suction blower P1. The drum 31 is formed of a hollow body, and suction holes 31c are formed on the drum surface, and the inside of the drum 31 is pressure-reduced by the drive of the suction blower P1 and the light-sensitive material is attracted onto the surface of the drum 31.

A red LED unit 320, green LED unit 321, and blue LED unit 322 are arranged in the optical unit 32. The light beam from the red LED unit 320, green LED unit 321, and blue LED unit 322 exposes an image onto the light-sensitive material P on the drum 31 through mirrors 325, 326, and 327, respectively from a condenser lens 331. An exposure shutter 332 opens and closes the optical path at the time of the exposure start/end by being opened and closed by an exposure solenoid 333.

The optical unit 32 is fixed to a movement belt 340, and is provided so that it can be moved in parallel with the drum axis by being guided by a pair of guide rails 341 and 342. The movement belt 340 is wound around a pair of pulleys 343 and 344, and one pulley 344 is connected to an output shaft 345 of a sub-scanning motor M7, and the optical unit 32 is moved in parallel with the drum axis by the drive of the sub-scanning motor M7.

In the drum axis direction of the optical unit 32, a sub-scanning reference position detecting sensor S11, a sub-scanning writing position detecting sensor S12, and a sub-scanning over run position detecting sensor S13 are arranged. The optical unit 32 is stopped by the sub-scanning reference position detection of the sub-scanning reference position detecting sensor S11, and the sub-scanning is started from this sub-scanning reference position, and the sub-scanning is stopped by the movement amount corresponding to the image size, and the optical unit 32 is moved to the sub-scanning reference position and returned.

In the sheet delivery section 50, conveyance rollers 52, 53, a conveyance guide 54, a separation guide 51 and an exit shutter 55 are arranged. The conveyance rollers 52 and 53 are driven being interlocked with each other by a conveyance motor M8. The separation guide 51 is moved upward and downward by a separation guide up-down motor M9, and at the upper position, a claw portion 51a of the separation guide 51 separates the light-sensitive material of the drum, and at the lower position, the light-sensitive material is accumulated. The open and close of the separation guide 51 are detected by a separation guide opening sensor S14, and a separation guide closing sensor S15. A separation jam detecting sensor S30 is provided on the sheet delivery path of the light-sensitive material.

The exit shutter 55 is opened and closed by an exit shutter motor M10. The open and close of the exit shutter 55 is detected by an exit shutter open detecting sensor S16. The exit shutter 55 determines the delivery timing of the light-sensitive material, and opens the exit shutter 55 at the predetermined timing, and sends the light-sensitive material to the development processing unit 4. Further, an exit sensor S31 to detect that the light-sensitive material is sent to the development processing unit 4, is provided.

The accumulator section 60 is arranged at the lower position of the sheet delivery section 50, and when the separation guide 51 is moved downward, the light-sensitive material hangs down in the accumulator section 60. According to this, when the light-sensitive material is accumulated at the high speed (to the development conveyance speed), the light-sensitive material can be sent to the development processing unit 4 without being damaged.

Figure 8:
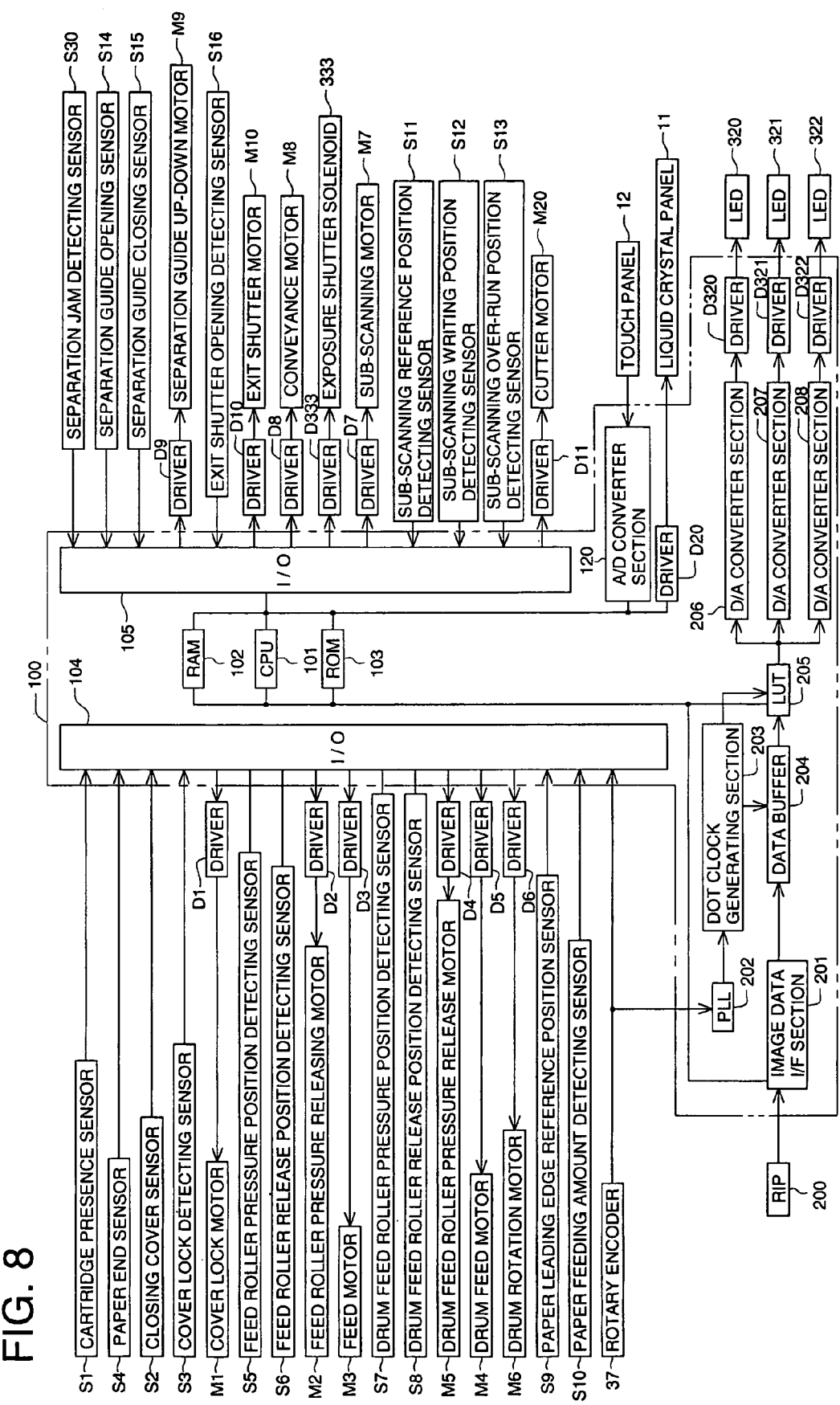
FIG. 8 is a block diagram showing the electronics of the embodiment of FIG. 2.

In FIG. 8, the electrical structure of the present apparatus will be shown as a block diagram. As shown in this FIG. 8, the control section 100 has a CPU 101, RAM 102, and ROM 103, and is connected to each sensor and a group of actuators through I/O ports 104 and 105, and controls the group of actuators according to the information from each sensor.

All sensors are connected: the cartridge presence sensor S1, closing cover sensor S2, cover lock detecting sensor S3, paper end sensor S4, feed roller pressure position detecting sensor S5, feed roller release position detecting sensor S6, drum feed roller pressure position detecting sensor S7, drum feed roller release position detecting sensor S8, paper leading edge reference position sensor S9, paper feeding amount detecting sensor S10, rotary encoder 37, sub-scanning reference position detecting sensor S11, sub-scanning writing position detecting sensor S12, sub-scanning over-run position detecting sensor S13, separation guide opening sensor S14, separation guide closing sensor S15, exit shutter opening detecting sensor S16, and separation jam detecting sensor S30. Further, the exit sensor S31 which is not shown in this drawing, is also connected.

The group of actuators, a cover lock motor M1, feed roller pressure releasing motor M2, feed motor M3, cutter motor M20, drum feed motor M4, drum feed roller pressure release motor M5, drum rotation motor M6, sub-scanning motor M7, exposure shutter solenoid 333, conveyance motor M8, separation guide up-down motor M9, and exit shutter motor M10 are connected and respectively driven through drivers D1, D2, D3, D11, D5, D4, D6, D7, D333, D8, D9, and D10.

Further, in the operation section 8, a liquid crystal panel 11 is controlled by a driver D20, and displays the operation condition of the color proof forming apparatus. Further, a command by the operation from a touch panel 12 is sent to the CPU 101 as the digital information by an A/D converter 120.

From an RIP 200 connected to the outside, the digital image information is sent to a data buffer 204 through an image data I/F section 201. The digital image information is synchronized with an output signal from a PLL 202 according to the light-sensitive material feeding information from the rotary encoder 37. The output signal is given to drivers D320, D321, and D322, from the data buffer 205 through a LUT (Look Up Table) 205 and D/A converter sections 206–208 by a dot clock of a dot clock generation section 203. These drivers D320, D321 and D322, drive the red LED unit 320, green LED unit 321, and blue LED unit 322, respectively.

In further detail, the dot image data of each color (Y, M, C, BK) formed by the RIP 200 is transferred to the image data I/F section 201, data-converted from the RIP format to the exposure format, and accumulated in the data buffer 204. After the image data for one sheet is accumulated in the data buffer 204, all colors are simultaneously exposed.

In this case, the Y, M, C, BK print data of the printed matter, which corresponds to the LED light emission minimum driven dot (pixel) at the time of exposure, is sent as 16 combinations as shown in FIG. 1. As shown in FIG. 1, it is converted into combinations of the LED light emission intensity of R, G, B specified by the LUT 205, and the exposure is conducted in a pixel unit in which the lED light emission of 3 wavelengths overlap.

Herein, the LUT 205 is characterized in that it forms different exposure data for the image data in which black and other colors overlap, than for the image data of black only. That is, in the present embodiment, different exposure data is formed for the image data in which black and other colors overlap, than for the image data of black only and the light-sensitive material is exposed in the different conditions. According to this, a color proof can be formed by which a portion of an image with only black, and a black overlap portion of an image can be discriminated.

FIG. 1 shows the content of the table of the printing data and the light emission intensity of the LED unit when the direct, positive, light-sensitive material is used. Incidentally, the relationship between the light emission amount of the LED unit and the density of the light-sensitive material obtained by the exposure, is defined as shown in FIG. 9.

The LUT 205 stores the data regulating the correspondence with the reference colors of the print, that is, Y (yellow), M (magenta), C (cyan), B (blue), G (green), R (red), BK (black), GY (gray), and W (white), and the intensity of the component of the light of the light source by which these reference colors are exposed onto the light-sensitive material, that is, R (red), G (green), B (blue).

Figures 9, 10:
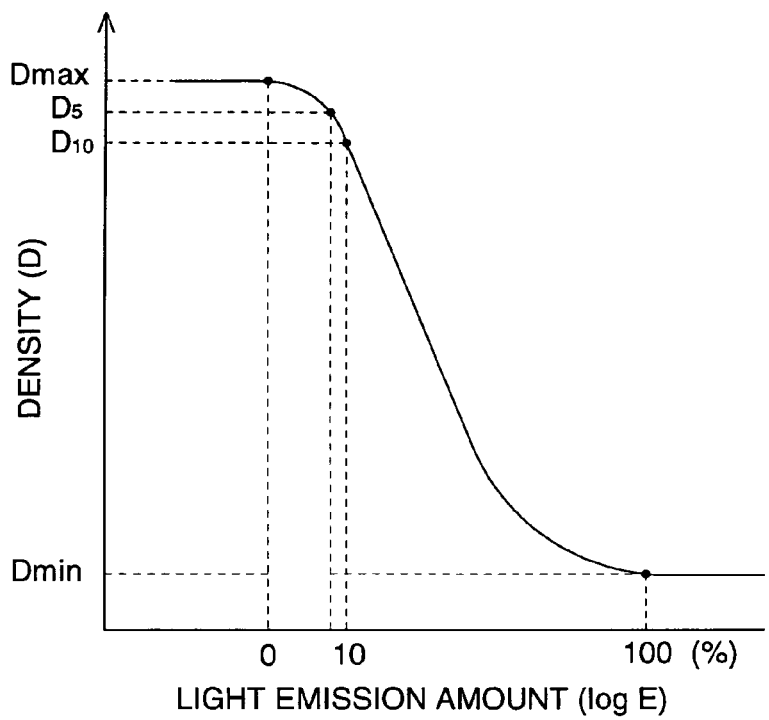
FIG. 9 is a characteristic view showing an example of the relationship between an exposure amount and the density of the light-sensitive material in an embodiment consistent with the present invention.
FIG. 10 is a view showing an example of the LUT in a conventional apparatus.

Herein, conventionally, the drive of the LED unit is according to a digital modulation of only ON and OFF, and the LED light emission intensity is either one of 0% (the LED unit does not emit the light), or 100% (the LED unit emits the light at an optimum light emission amount to the light-sensitive material)(refer to FIG. 10). However, in that case, the kind of the Y, M, C, BK coloring density of the light-sensitive material is fixed, and the black only portion and the black overlap portion are exposed so that both portions become black (BK) (FIG. 10 (1)).

In contrast to that, in the present embodiment, not only is 0% and 100% of the light emission amount in FIG. 9 used, but also 5% and 10%. When BK is reproduced, each LED unit respectively emits 5% of the light emission amount, and the density of D5, which is slightly less than the conventional Dmax, is obtained for each color. Further, for other colors which overlap the BK, 5% light emission, not the conventional 0%, is conducted so that the weight becomes clear (FIG. 1 (1)). Incidentally, in this case, when all of Y, M, and C and the BK overlap, 0% light emission is conducted, and the maximum density is obtained.

Further, at the same time as the density is lowered as described above, the reproduction of colors other than the BK is conducted so that each LED unit respectively emits 10% of the light emission amount in FIG. 9, which is not the conventional 0% for each color, and the density of D10, which is slightly less then conventional Dmax, is obtained for each color (FIG. 1 (2)).

When the exposure data is formed from the image data by using the above-described LUT 205, a higher density black color can be generated on the color light-sensitive material for image data in which BK overlaps other colors (Y, M, C, R, G, B, GY) than the black color generated for the image data of only BK. Further, it can also be discriminated which color BK overlaps.

Figures 11, 12:
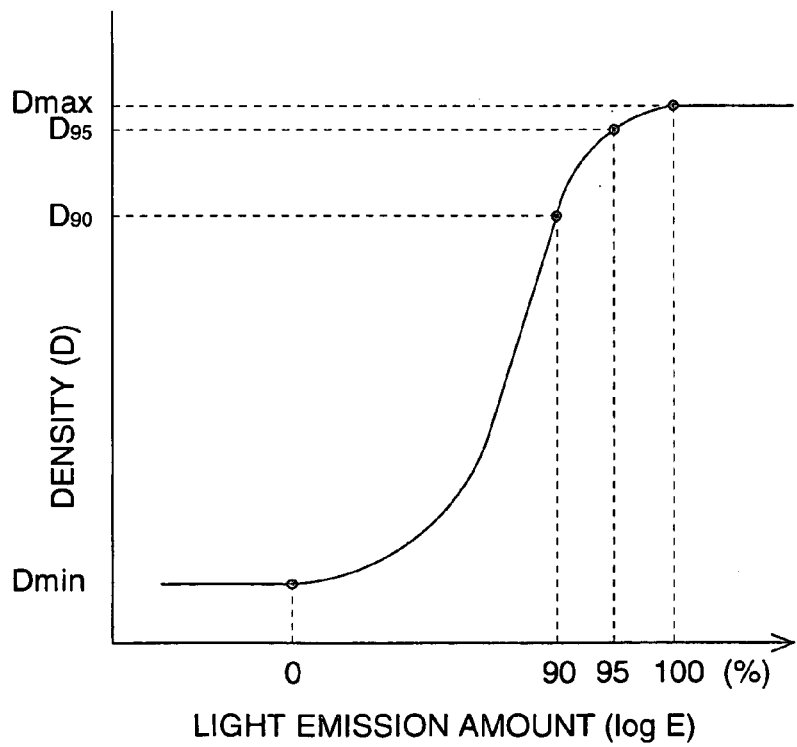
FIG. 11 is an illustration showing another example of the LUT of an embodiment consistent with the present invention.
FIG. 12 is a characteristic view showing an example of the relationship between the exposure amount and the density of the light-sensitive material in an embodiment consistent with the present invention.

FIG. 11 shows the table content of the print data and the light emission intensity of the LED unit, when the negative light-sensitive material is used. The relationship between the light emission amount of the LED unit and the density of the light-sensitive material obtained by the exposure is defined as shown in FIG. 12.

Also in the case of this negative light-sensitive material, conventionally, the drive of the LED unit is according to the digital modulation of only ON and OFF, and the LED light emission intensity is either one of 0% (the LED unit does not emit the light), or 100% (the LED unit emits an optimum amount of light to the light-sensitive material). Because the kind of the Y, M, C, BK coloring density of the light-sensitive material is fixed, when a black-only portion of the image and a black overlap portion of the image are exposed both of these portions become a black image (BK).

In contrast to that, in the present embodiment, not only 0% and 100% of the light emission amount in FIG. 12, but also 90% and 95% are used. When BK is reproduced, each LED unit respectively emits 95% of the light emission, and the density of D95, which is slightly less than the conventional Dmax, is obtained for each color. Further, for other colors that overlap BK, the respective LED unit emits 100% of the light emission so that the weight becomes clear (FIG. 11 (1)). Incidentally, in this case, when Y, M, and C all overlap BK, 100% of the optimum light emission amount is emitted for each color, and the maximum density is obtained.

At the same time that the black color density is lowered as described above, the reproduction of a color that does not overlap BK, is conducted so that each LED unit respectively emits 90% of the light emission, in contrast to the conventional 100% for each color. The density of D90, which is slightly less than conventional Dmax, is obtained for each color (FIG. 11 (2)).

When the exposure data is formed from the image data by using the above-described LUT 205, the image data results in a black being generated on the color-sensitive material for a portion in which black and other colors overlap that is a higher density than the black color generated for a black-only portion. Moreover, one may discriminate which color overlaps black in the black overlap portion.

Incidentally, in the above description, when the light emission intensity is controlled to 5%, 10%, 90%, 95%, except for 0% and 100%, the exposure is conducted so that the weight of other colors to the BK color can be known, however, the numeric values to regulate the light emission intensity are not limited to the values shown here. Further, corresponding to the color of the ink, the values of 0%, 5%, 10%, 90%, 95%, 100%, may be changed for each color, or for each case.

Further, the density of the portion in which BK and other colors overlap, is set to be higher than the density of the portion of only BK, however, this may be reversely set.

Incidentally, in the case where the positive light-sensitive material using the panchromatic emulsion is used, when BK and other colors overlap, by setting the light emission amount, which is conventionally 0%, to 5%, the photosensitive layer of the panchromatic emulsion does not react, but the photosensitive light of the color corresponding to the exposure reacts to it, and the resulting color density is lowered. Also due to this, the weight of the BK color and other colors can be distinctly shown.

Further, in the above embodiment, the apparatus in which the image recording is conducted by dot image data is described as an example. However, the present invention can be applied to an image recording apparatus in which the exposure is conducted by the light source corresponding to a plurality of colors, without being limited to dot image data.

(Operation)

Herein, operations of an image recording apparatus to which the embodiment of the present invention is applied, will be described.

Figure 13:
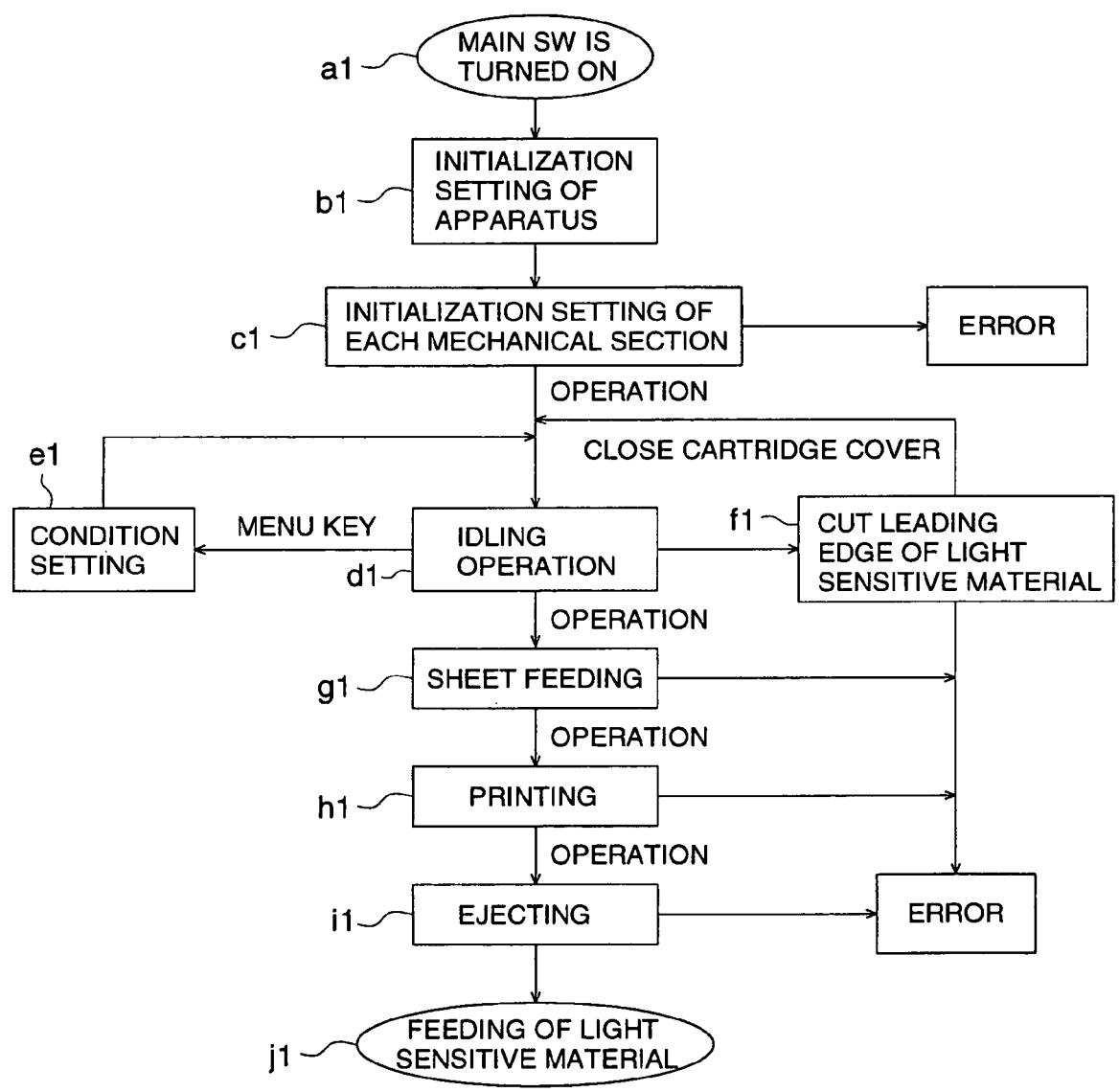
FIG. 13 is a flow chart showing an operation of an embodiment consistent with the present invention.
Figure 14:
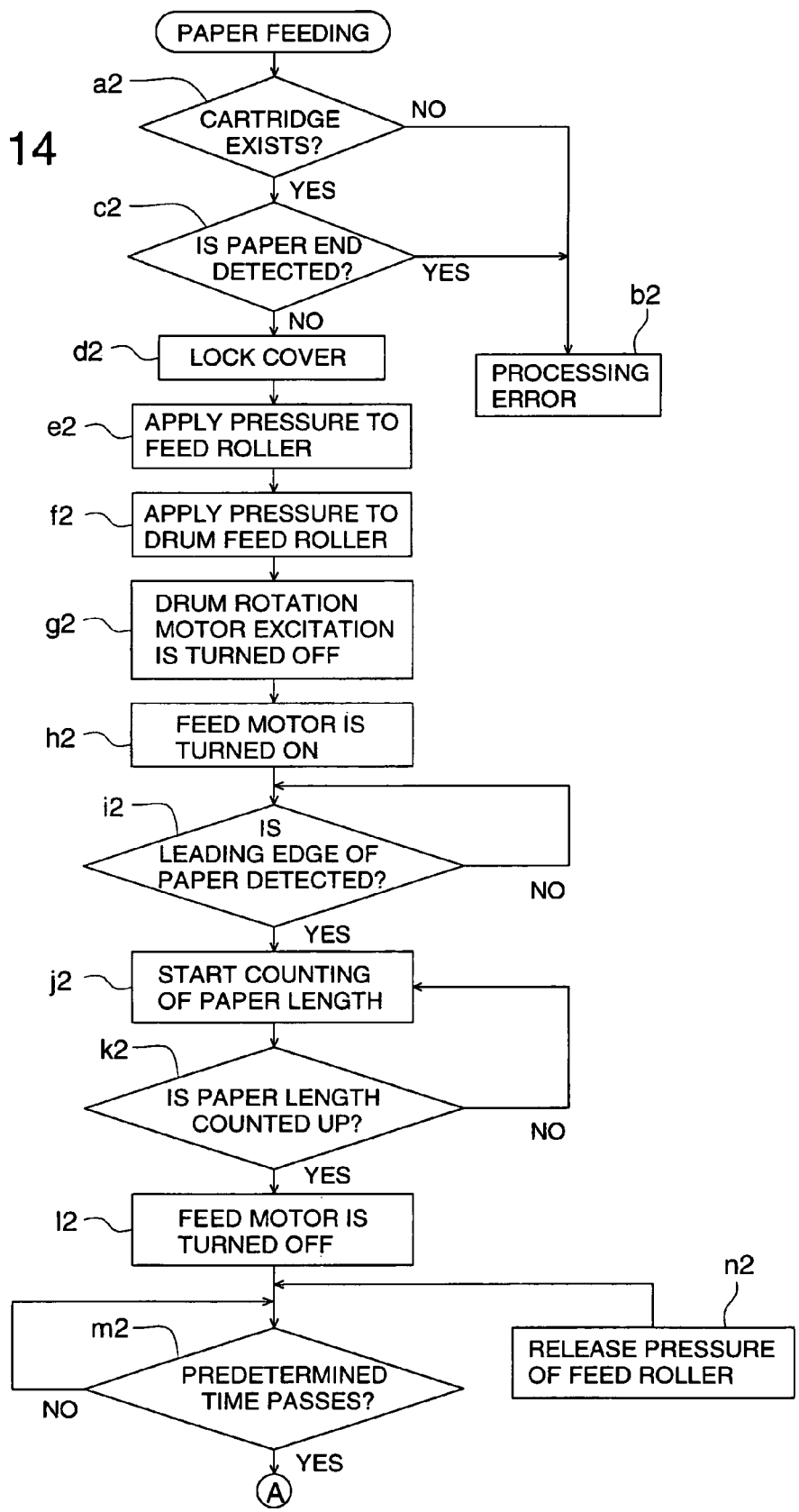
FIG. 14 is a flow chart showing an operation of the embodiment of FIG. 13.
Figure 15:
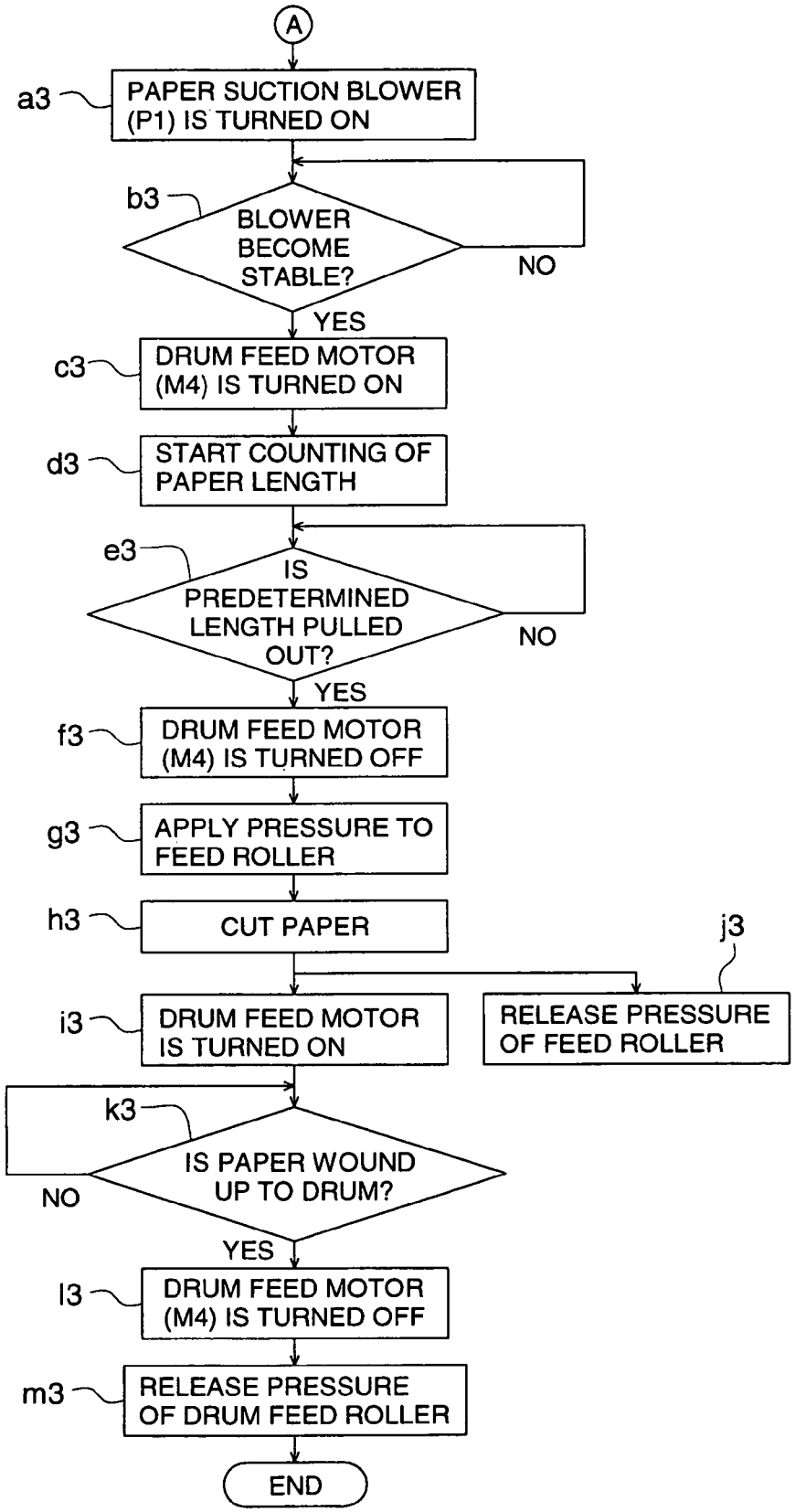
FIG. 15 is a flow chart showing an operation of the embodiment of FIG. 13.
Figure 16:
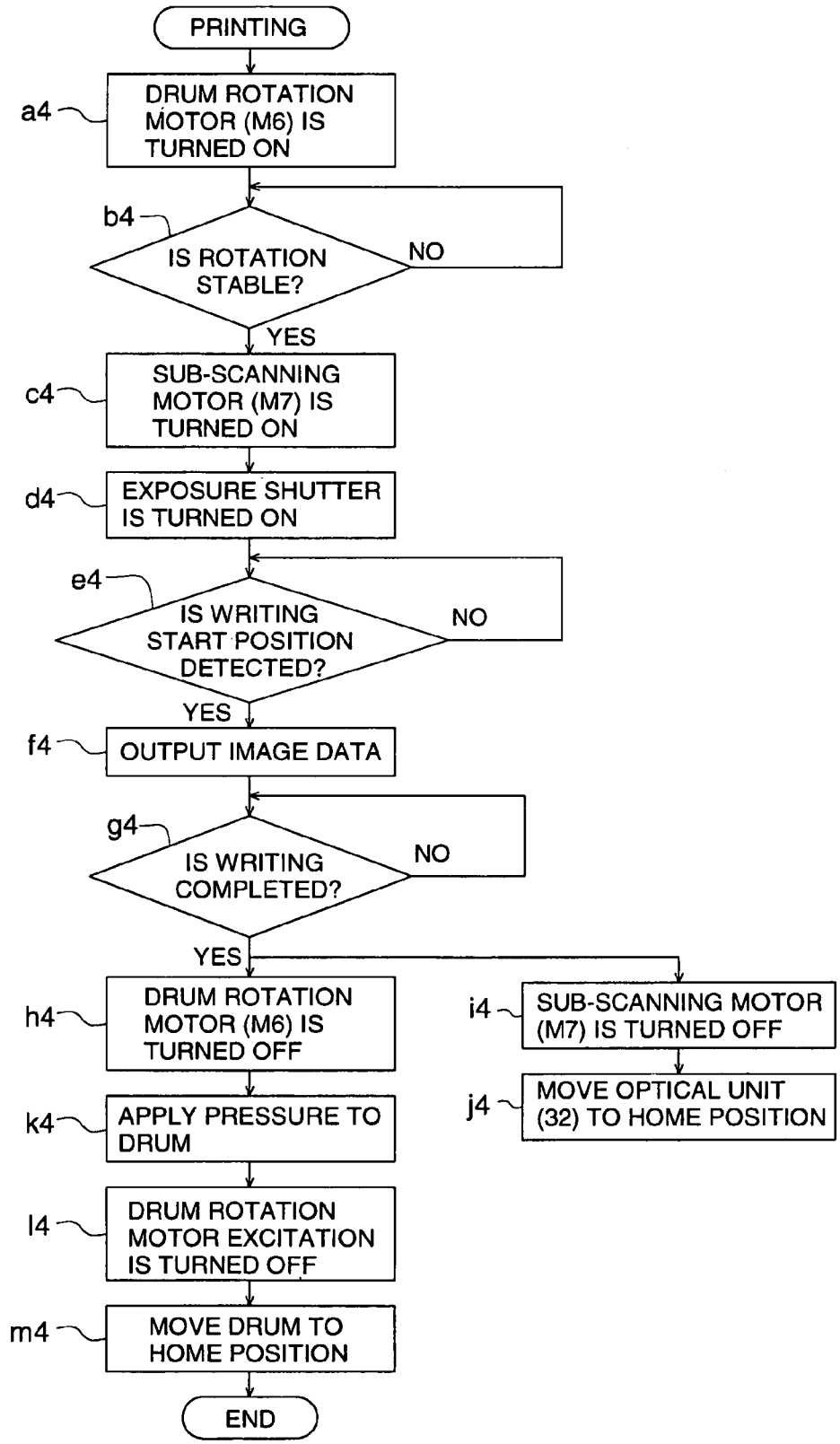
FIG. 16 is a flow chart showing an operation of the embodiment of FIG. 13.
Figure 17:
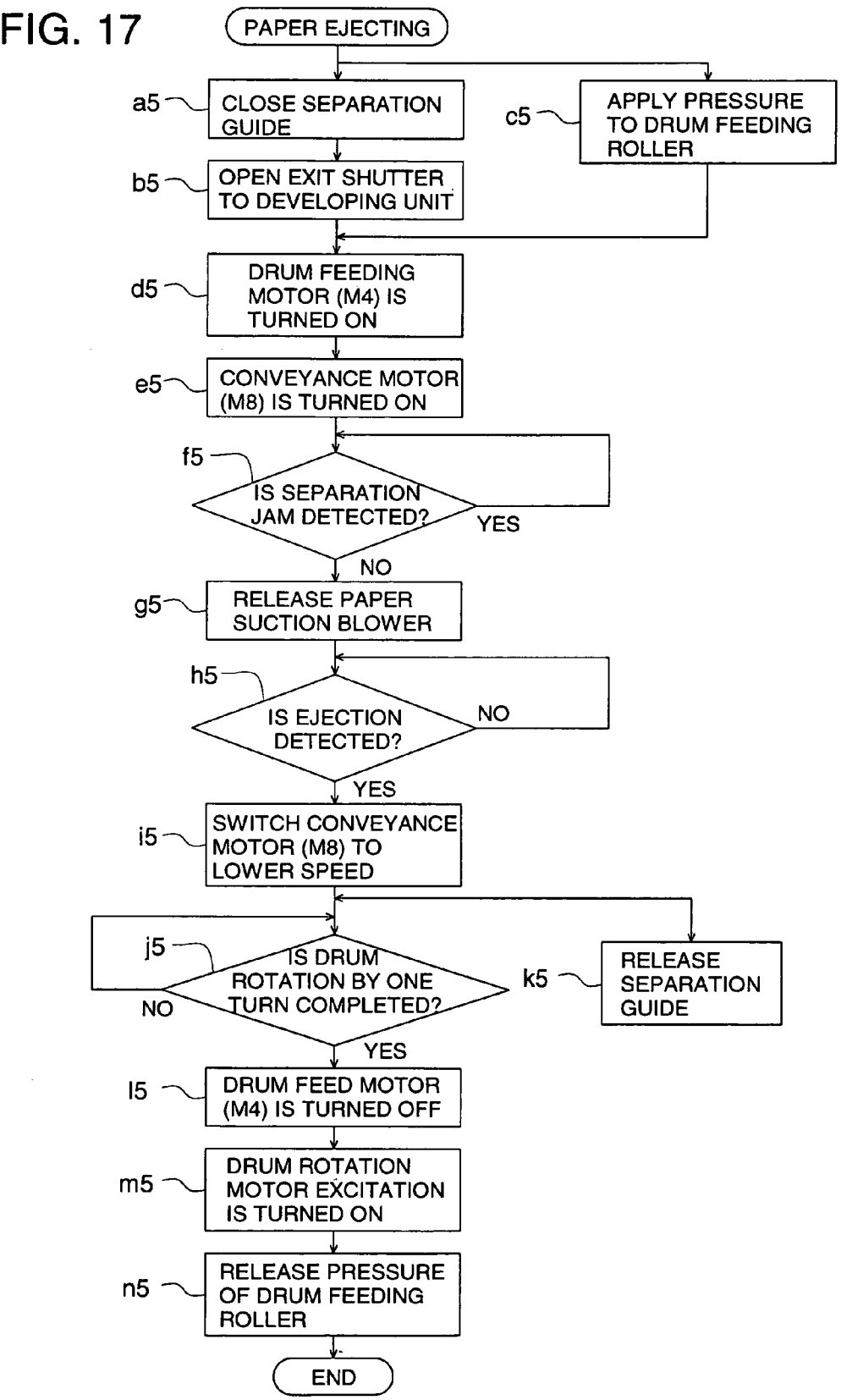
FIG. 17 is a flow chart showing an operation of the embodiment of FIG. 13.
Figure 18:
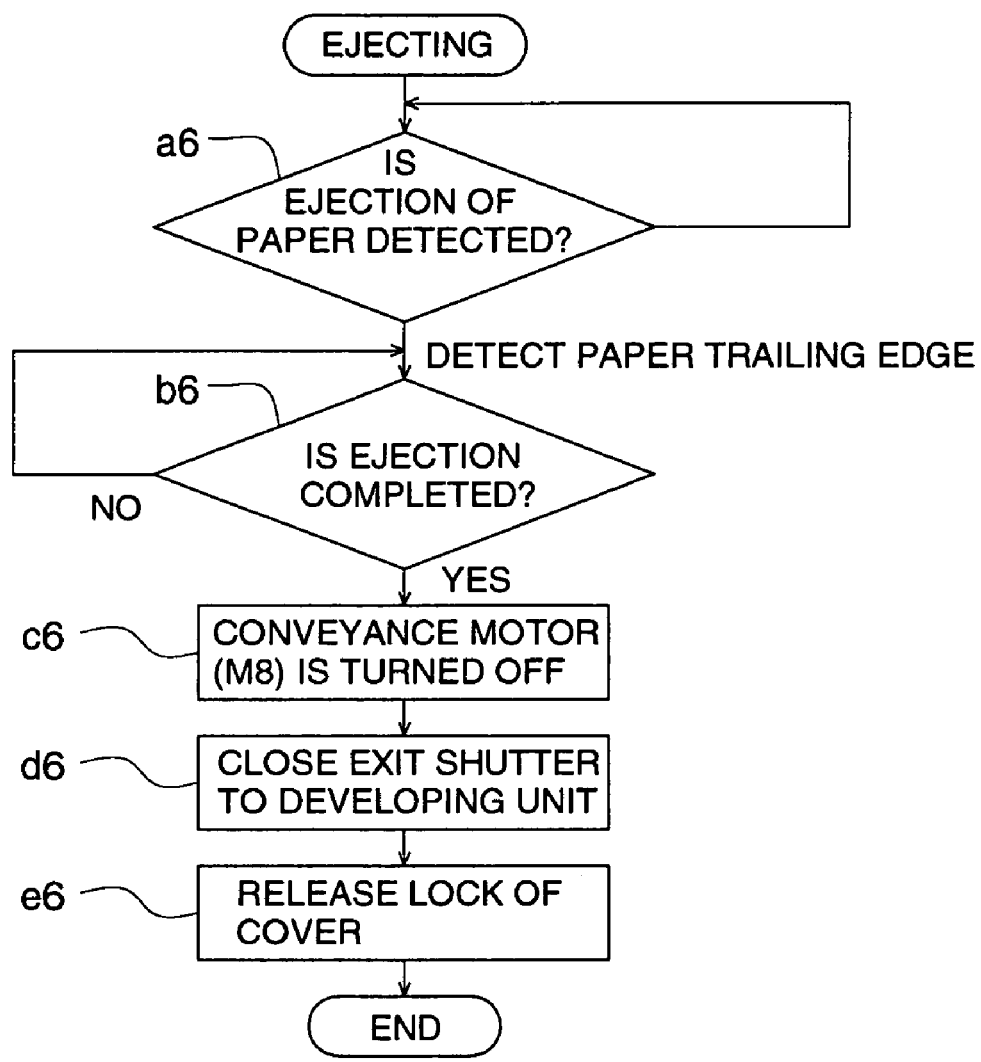
FIG. 18 is a flow chart showing an operation of the embodiment of FIG. 13.

Referring to FIG. 13 to FIG. 18, operations of the color proof forming apparatus will be described below. FIG. 13 is a main flow chart of the operations of the color proof forming apparatus, FIG. 14 and FIG. 15 are flow charts of the sheet feed processing of the color proof forming apparatus, FIG. 16 is a flow chart of the print processing of the color proof forming apparatus, FIG. 17 is a flow chart of the sheet delivery processing of the color proof forming apparatus, and FIG. 18 is a flow chart of the delivery processing of the color proof forming apparatus.

Initially, a main operation of the color proof forming apparatus will be described. In a main flow chart of the operation of the color proof forming apparatus in FIG. 13, when the main switch is turned ON in step a1, the initial setting of the apparatus is conducted in step b1, further, the initial setting of each mechanism part is conducted in step c1, and when an error occurs herein, the function stops.

When the initial setting is completed, an idling operation is conducted, and a remote processing can be conducted (step d1). The condition setting can be conducted by the operation of the menu key of the touch panel 12 of the operation section 8 during this idling operation (step e1), and when this condition setting is conducted, the local processing can be conducted. When the condition setting is not conducted by the operation of the menu key of the touch panel 12, the remote processing by which the output image from the RIP is received and the print of the received image data is conducted, is carried out.

Further, when the light-sensitive material runs out and needs to be replenished during the idling operation, the sheet feed cover 9 is opened, the cartridge 10 is set, the sheet feed cover 9 is closed, and the sheet feed processing to cut a fogged portion of the leading edge of the light-sensitive material is conducted, and the operation returns to the idling operation (step f1). However, when an error occurs in the sheet feed processing to cut the fogged portion of the leading edge of the light-sensitive material, the function is stopped.

The writing operation consists of the sheet feeding (step g1), printing (step h1), and sheet delivery (step i1), and when this writing processing is completed, the next light-sensitive material can be fed (step j1).

Next, the sheet feed processing of the color proof forming apparatus will be described. In the flow chart of the sheet feed processing of the color proof forming apparatus in FIG. 14, the existence of the cartridge 10 is determined in step a2, and when the cartridge 10 does not exist, the error processing is conducted (step b2).

When the cartridge 10 exists, the trailing edge of the light-sensitive material is detected according to the detection signal from the paper end sensor S4 (step c2), and when the trailing edge of the light-sensitive material is detected, the error processing is conducted (step b2).

When the trailing edge of the light-sensitive material is not detected, the sheet feed cover 9 is locked (step d2), the feed roller 21b is brought into pressure-contact (step e2), and further, the drum feed roller 27 is brought into pressure-contact (step f2). Then, the excitation of the drum rotation motor M6 is turned OFF, and the drum 31 is made to be rotatable (step g2), the feed motor M3 is rotated, and the light-sensitive material is fed by the feed rollers 21a and 21b (step h2).

The leading edge portion of the light-sensitive material is detected by the paper leading edge reference position sensor S9 (step i2). When the leading edge is detected, the measurement of the length of the light-sensitive material is started by the rotation of the encoder roller 25 using the detection as the reference (step j2). The light-sensitive material is fed, and the length of light-sensitive material is measured from the feed amount of the light-sensitive material. When the length of light-sensitive material becomes a predetermined length (step k2), the feed motor M3 is turned OFF (step l2), a predetermined period of time for stabilization is counted (step m2), the pressure-contact of the feed roller 21b is released (step m2), and the light-sensitive material is made so that it can be conveyed by the rotation of the drum feed roller 23 and the drum 31.

In the flow chart of the sheet feed processing of the color proof forming apparatus in FIG. 15, the paper suction blower P1 is turned ON in step a3, and time for it to stabilize is counted (step b3). After the paper suction blower P1 stabilizes, the drum feed motor M4 is turned ON (step c3). Thereby, the paper is wound around the drum 31 while being sucked to it.

The paper length measurement is started in step d3, and after a predetermined length is pulled out (step e3), the drum feed motor M4 is turned OFF in step f3. The feed roller 21b is brought into pressure-contact in step g3, and the paper cut is conducted in step h3, the drum feed motor M4 is turned ON in step i3, and the pressure-contact of the feed rollers 21a and 21b is released in step j3.

After the waiting of the completion of the paper winding around the drum in step k3, the drum feed motor M4 is turned OFF in step l3, and the pressure-contact of the drum feed an delivery roller 23 is released in step m3.

In the flow chart of the print processing of the color proof forming apparatus in FIG. 16, the drum rotation motor M6 is turned ON in step a4, and time for the rotation of the drum 31 to stabilize is counted (step b4). The sub-scanning motor M7 is turned ON (step c4), the exposure shutter 332 is turned ON (step d4), and the optical unit 32 is moved in the direction of the drum axis and sub-scanning is conducted. The sub-scanning writing position is detected in step e4 and the image data is outputted (step f4).

At this time, the red LED unit 320, green LED unit 321, and blue LED unit 322 respectively emit the light according to the LUT data of the set channel, and expose the image having the color corresponding to the color of the ink at the time of the print and/or the color of the print sheet.

Incidentally, in this case, for image data in which BK and other colors (Y, M, C, R, G, B, GY) overlap, the exposure data is made so that a higher density or lower density black color is generated on the color light-sensitive material than the black color generated for image data of black only.

When the writing of the image data is completed in step g4, the drum rotation motor M6 is turned OFF (step h4), the sub-scanning motor M7 is turned OFF (step i4), and optical unit 32 is moved to the home position (step j4).

Then, the drum feed roller 23 is brought into pressure-contact with the drum 31 in step k4, the excitation of the drum rotation motor M6 is turned OFF (step 14), and the drum 31 is moved to the home position by the rotation of the drum feed roller 23 (step m4).

In the flow chart of the sheet delivery processing of the color proof forming apparatus in FIG. 17, the separation guide 51 is closed and set to the separation position in step a5, and the exit shutter 55 to the development processing unit 4 is opened (step b5), and it is brought into pressure-contact with the drum feed roller 23 (step c5).

The drum feed motor M4 is turned ON in step d5 and the drum feed roller 23 is rotated, and the conveyance motor M8 is turned ON, and the light-sensitive material is conveyed at high speed and fed (step e5). The separation jam detecting sensor S30 determines whether a separation jam of the light-sensitive material has occurred (step f5). When no separation jam occurs, the drive of the suction blower P1 is stopped and the suction of the light-sensitive material is released (step g5).

In step h5, the delivery of the light-sensitive material is detected by the exit sensor S31, and the conveyance motor M8 is switched to the low speed and matched with the processing in the development processing unit 4 (step i5). Then, the drum 31 is rotated by one rotation (step j5), and the separation guide 51 is opened (step k5).

The drum feed motor M4 is turned OFF in step 15, and the excitation of the drum rotation motor M6 is conducted so that the drum 31 is not freely rotated (step m5), and the pressure-contact of the drum feed roller 23 is released, and the sheet delivery processing is completed (step n5).

In the flow chart of the sheet delivery processing of the color proof forming apparatus in FIG. 18, the delivery of the light-sensitive material is detected by the exit sensor S31 in step a6. When the trailing edge of the light-sensitive material is detected, a predetermined period of time in which to complete the delivery of the light-sensitive material is counted (step b6), and the conveyance motor M8 is turned OFF (step c6), the exit shutter 55 to the development processing unit 4 is closed (step d6), the lock of the feed cover 9 is released, and the delivery processing of the light-sensitive material is completed (step e6).

An example in which the LED units are used as the R light source, G light source, and B light source is described above. However, each R, G, B light source is not limited to LED units, but all of the R, G, B light sources may be LDs (laser diode), or of course, an AOM and LD.

As detailed above, when the exposure data differs for image data in which black and other colors overlap, than for image data of only black the color light-sensitive material is exposed to different conditions, allowing a portion of only black can be discriminated from a black overlap portion, on the color proof which is formed.

As described above, the performance and the reliability as the DDCP are increased, and the check of the black overlap print can be conducted in the stage before printing.

What is claimed is:

1. A color proof forming apparatus comprising:
a plurality of light sources having different wavelengths and emitting light beams by which a color light-sensitive material is exposed;
an image processor, which receives image data for a plurality of colors including black, and forms first exposure data for image data in which black and another color overlap and second exposure data for black-only image data that differs from the first exposure data; and
a controller, which controls the plurality of light sources according to the first and second exposure data formed by the image processor,
wherein the first exposure data results in a higher density black color being generated in the color light-sensitive material for the image data in which black and another color overlap, than the density of the black color generated for the black-only image data.

2. A color proof forming apparatus comprising:
a plurality of light sources having different wavelengths and emitting light beams by which a color light-sensitive material is exposed;
an image processor, which receives image data for a plurality of colors including black, and forms first exposure data for image data in which black and another color overlap and second exposure data for black-only image data that differs from the first exposure data; and
a controller, which controls the plurality of light sources according to the first and second exposure data formed by the image processor,
wherein the first exposure data results in a lower density black color being generated in the color light-sensitive material for the image data in which black and another color overlap, than the density of the black color generated for the black-only image data.

3. A color proof forming method comprising the steps of:
receiving first image data in which black and another color overlap and second, black-only, image data;
forming first exposure data for the first image data that differs from second exposure data for the second, black-only, image data;
exposing a color light-sensitive material according to the first and second exposure data; and
forming a color proof
wherein the color light sensitive material will generate a black color of a first density after exposure according to the first exposure data and a black color of a second, lower, density after exposure according to the second exposure data.

4. A color proof forming method comprising the steps of:
receiving first image data in which black and another color overlap and second, black-only, image data;
forming first exposure data for the first image data that differs from second exposure data for the second, black-only, image data;
exposing a color light-sensitive material according to the first and second exposure data; and
forming a color proof
wherein the color light sensitive material will generate a black color of a first density after exposure according to the first exposure data and a black color of a second, higher, density after exposure according to the second exposure data.

5. A color proof forming method comprising the steps of:
exposing a color light-sensitive material according to first exposure data for first image data in which black and another color overlap and to second exposure data for second, black-only, image data; and
forming a color proof,
wherein the color light sensitive material will generate a black color of a first density after exposure according to the first exposure data and a black color of a second, lower, density after exposure according to the second exposure data.

6. A color proof forming method comprising the steps of:

exposing a color light-sensitive material according to first exposure data for first image data in which black and another color overlap and to second exposure data for second, black-only, image data; and forming a color proof, wherein the color light sensitive material will generate a black color of a first density after exposure according to the first exposure data and a black color of a second, higher, density after exposure according to the second exposure data.

\* \* \* \* \*